(12) United States Patent
Usumoto et al.

(10) Patent No.: US 10,479,116 B2
(45) Date of Patent: Nov. 19, 2019

(54) BASE MATERIAL PROCESSING APPARATUS AND DETECTION METHOD

(71) Applicant: SCREEN HOLDINGS CO., LTD., Kyoto-shi, Kyoto (JP)

(72) Inventors: Hiroaki Usumoto, Kyoto (JP); Mitsuhiro Yoshida, Kyoto (JP); Takaharu Yamamoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/882,218

(22) Filed: Jan. 29, 2018

(65) Prior Publication Data
US 2018/0272768 A1    Sep. 27, 2018

(30) Foreign Application Priority Data

Mar. 24, 2017 (JP) .................................. 2017-058462
Aug. 31, 2017 (JP) .................................. 2017-166917

(51) Int. Cl.
*B41J 19/20*  (2006.01)
*B41J 11/00*  (2006.01)
(Continued)

(52) U.S. Cl.
CPC ........... *B41J 19/205* (2013.01); *B41J 11/008* (2013.01); *B41J 11/0095* (2013.01); *B41J 15/04* (2013.01);
(Continued)

(58) Field of Classification Search
CPC .... B41J 19/205; B41J 11/0095; B41J 11/008; B41J 15/04
See application file for complete search history.

(56) References Cited

U.S. PATENT DOCUMENTS

| 3,832,064 A | 8/1974 | Horst et al. |
| 2005/0062780 A1 | 3/2005 | Chee |

(Continued)

FOREIGN PATENT DOCUMENTS

| CN | 1597320 A | 3/2005 |
| CN | 1688447 A | 10/2005 |

(Continued)

OTHER PUBLICATIONS

Extended European Search Report issued in corresponding European Patent Application No. 18152953.8-1017, dated Aug. 8, 2018.
(Continued)

*Primary Examiner* — Jason S Uhlenhake
(74) *Attorney, Agent, or Firm* — McDermott Will & Emery LLP

(57) ABSTRACT

A base material processing apparatus includes first and second edge sensors and a displacement amount calculation part. The first edge sensor acquires a first detection result (R1) by detecting the position of an edge of a base material in a width direction at a first detection position. The second edge sensor acquires a second detection result (R2) by detecting the position of the edge of the base material at a second detection position. The displacement amount calculation part calculates the amount of displacement in the position of the base material in the transport direction or the amount of difference in the transporting speed of the base material on the basis of the first and second detection results (R1, R2). Thus, the amount of displacement in the position or the amount of difference in the transporting speed can be detected without depending on images such as register marks.

15 Claims, 8 Drawing Sheets

(51) Int. Cl.
  *B41J 15/04* (2006.01)
  *B65H 23/02* (2006.01)
  *B65H 23/04* (2006.01)
  *G03G 15/00* (2006.01)
  *G06T 7/13* (2017.01)
  *B41J 29/393* (2006.01)
  *H04N 1/50* (2006.01)
  *B65H 23/188* (2006.01)

(52) U.S. Cl.
  CPC ........ *B41J 29/393* (2013.01); *B65H 23/0204* (2013.01); *B65H 23/046* (2013.01); *G03G 15/50* (2013.01); *G03G 15/5029* (2013.01); *G03G 15/652* (2013.01); *G06T 7/13* (2017.01); *H04N 1/506* (2013.01); *B41J 2029/3935* (2013.01); *B65H 23/1888* (2013.01); *B65H 2404/1152* (2013.01); *B65H 2511/512* (2013.01); *B65H 2513/10* (2013.01); *G03G 2215/0158* (2013.01)

(56) References Cited

U.S. PATENT DOCUMENTS

| | | |
|---|---|---|
| 2007/0001091 A1 | 1/2007 | Wittmann et al. |
| 2007/0291063 A1 | 12/2007 | Akase et al. |
| 2012/0240803 A1* | 9/2012 | Sato .................. B41J 11/42 101/485 |
| 2013/0074720 A1 | 3/2013 | Yamauchi |
| 2013/0232716 A1 | 9/2013 | Ina |
| 2016/0075155 A1 | 3/2016 | Fukui et al. |
| 2016/0121602 A1* | 5/2016 | Nagasu .............. B41J 11/008 347/14 |
| 2016/0121627 A1 | 5/2016 | Yoshida et al. |

FOREIGN PATENT DOCUMENTS

| | | |
|---|---|---|
| CN | 103029457 A | 4/2013 |
| CN | 105564050 A | 5/2016 |
| EP | 1 080 887 A1 | 3/2001 |
| EP | 1 748 279 A1 | 1/2007 |
| EP | 2 995 463 A1 | 3/2016 |
| EP | 3 017 956 A1 | 5/2016 |
| EP | 3 034 308 A2 | 6/2016 |
| JP | 2006-259531 A | 9/2006 |
| JP | 2016-55570 A | 4/2016 |
| JP | 2016-083809 A | 5/2016 |

OTHER PUBLICATIONS

Chinese Office Action issued in corresponding Chinese Patent Application No. 201810075291.9, dated Jul. 2, 2019.

* cited by examiner

BASE MATERIAL PROCESSING APPARATUS AND DETECTION METHOD

BACKGROUND OF THE INVENTION

Field of the Invention

The present invention relates to a technique for detecting the amount of displacement in the position of a base material in a transport direction or the amount of difference in the transporting speed of the base material, the technique being used in a base material processing apparatus for processing a long band-like base material while transporting the base material.

Description of the Background Art

Inkjet image recording apparatuses have conventionally been known in which an image is printed on long band-like printing paper by ejecting ink from a plurality of recording heads while transporting the printing paper in a longitudinal direction of the paper. The image recording apparatuses eject ink of different colors from a plurality of heads respectively. Single-color images formed by the ejection of each color ink are superimposed on one another so that a multicolor image is recorded on a surface of the printing paper. One example of the conventional image recording apparatuses is described in, for example, Japanese Patent Application Laid-Open No. 2016-55570.

This type of image recording apparatuses are designed to transport printing paper at a constant speed with use of a plurality of rollers. In some cases, however, the transporting speed of the printing paper under the recording heads may differ from an ideal transporting speed due to a slip occurring between roller surfaces and the printing paper or due to elongation of the printing paper caused by the ink. In this case, misregistration of single-color images occurs because the positions at which each color ink is ejected on the surface of the printing paper are displaced in the transport direction.

In order to suppress such misregistration of single-color images, reference images such as register marks have conventionally been formed on a surface of printing paper. The image recording apparatuses detect the positions of the reference images and correct the positions of ink to be ejected from each recording head on the basis of the detection results. However, since the reference images are formed at predetermined intervals in the transport direction of the printing paper, it is difficult to continuously detect misregistration on the printing paper on the basis of the reference images. Besides, the space for recording an intended print image is narrowed if the reference images are formed on the surface of the printing paper.

SUMMARY OF THE INVENTION

It is an object of the present invention to provide a technique for detecting the amount of displacement in the position of a base material in a transport direction or the amount of difference in the transporting speed of the base material without depending on images such as register marks formed on a surface of the base material, the technique being used in a base material processing apparatus for processing a long band-like base material while transporting the base material in a longitudinal direction of the base material.

To solve the problems described above, a first aspect of the present invention is a base material processing apparatus that includes a transporting mechanism that transports a long band-like base material in a longitudinal direction of the base material along a predetermined transport path, a first detection part that acquires a first detection result by continuously or intermittently detecting a position of an edge of the base material in a width direction at a first detection position in the transport path, a second detection part that acquires a second detection result by continuously or intermittently detecting the position of the edge of the base material in the width direction at a second detection position that is located downstream of the first detection position in the transport path, and a displacement amount calculation part that calculates an amount of displacement in position of the base material in a transport direction or an amount of difference in transporting speed of the base material on the basis of the first detection result and the second detection result.

A second aspect of the present invention is a detection method for detecting an amount of displacement in position of a long band-like base material in a transport direction or an amount of difference in transporting speed of the base material while transporting the base material in a longitudinal direction of the base material along a predetermined transport path. The method includes a) acquiring a first detection result by continuously or intermittently detecting a position of an edge of a base material in a width direction at a first detection position in the transport path, b) acquiring a second detection result by continuously or intermittently detecting the position of the edge of the base material in the width direction at a second detection position that is located downstream of the first detection position in the transport path, and c) calculating an amount of displacement in position of the base material in the transport direction or an amount of difference in transporting speed of the base material on the basis of the first detection result and the second detection result.

According to the first and second aspects of the present invention, the amount of displacement in the position of the base material in the transport direction or the amount of difference in the transporting speed of the base material can be detected without depending on images such as register marks formed on a surface of the base material.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

1. First Embodiment

<1-1. Configuration of Image Recording Apparatus>

Figure 1:
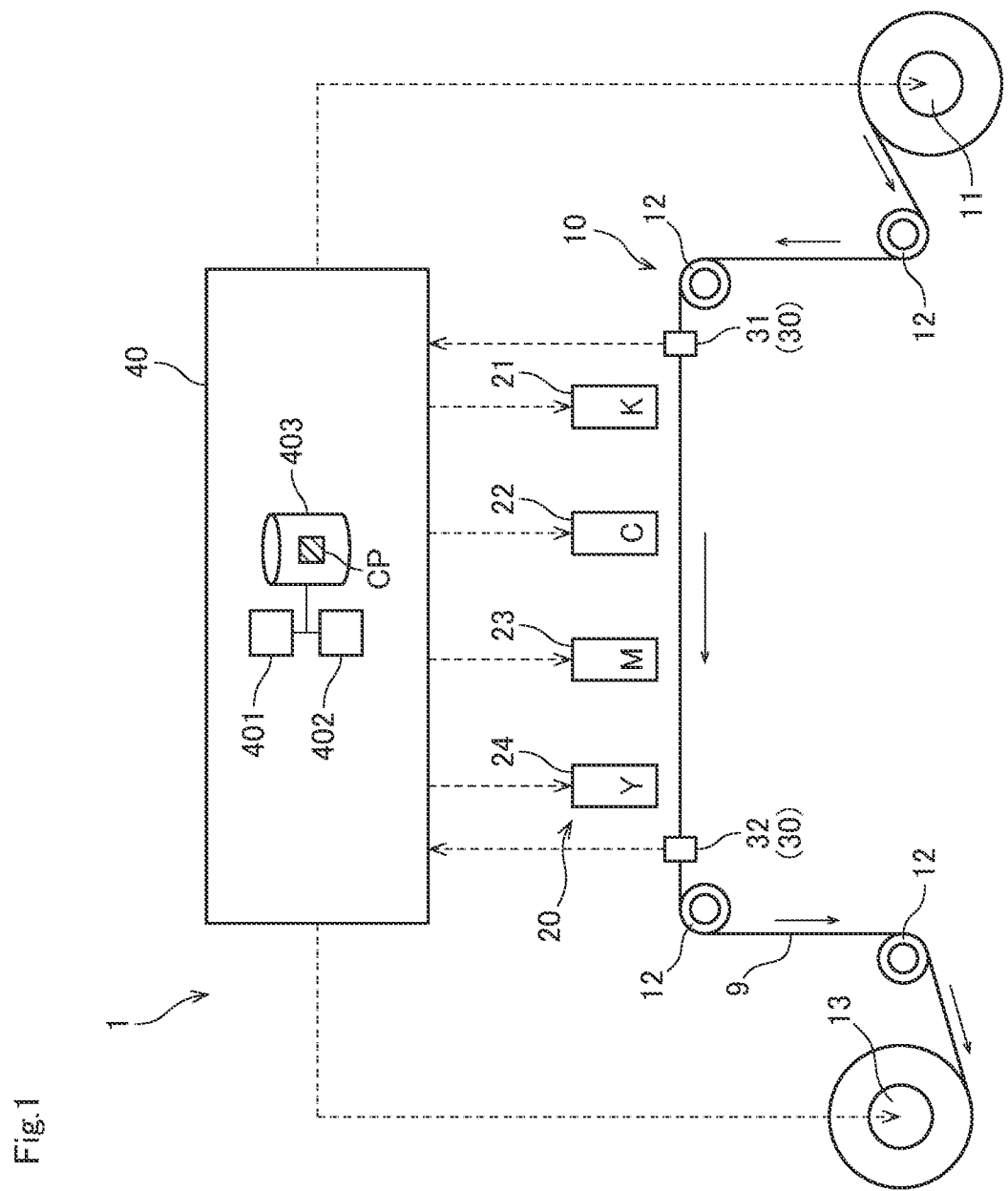
FIG. 1 illustrates a configuration of an image recording apparatus according to a first embodiment.

FIG. 1 illustrates a configuration of an image recording apparatus 1 as one example of a base material processing apparatus according to a first embodiment of the present invention. The image recording apparatus 1 is an inkjet printing apparatus that records a multicolor image on printing paper 9, which is a long band-like base material, by ejecting ink toward the printing paper 9 from a plurality of recording heads 21 to 24 while transporting the printing paper 9. As illustrated in FIG. 1, the image recording apparatus 1 includes a transporting mechanism 10, an image recording part 20, two edge sensors 30, and a controller 40.

The transporting mechanism 10 is a mechanism for transporting the printing paper 9 in a transport direction that is along the length of the printing paper 9. The transporting mechanism 10 according to the present embodiment includes a plurality of rollers that include a feed roller 11, a plurality of transporting rollers 12, and a take-up roller 13. The printing paper 9 is fed from the feed roller 11 and transported along a transport path constructed by the plurality of transporting rollers 12. Each transporting roller 12 rotates about a horizontal axis so as to guide the printing paper 9 downstream of the transport path. The transported printing paper 9 is collected by the take-up roller 13. These rollers are rotationally driven by a drive part 45 of the controller 40, which will be described later.

As illustrated in FIG. 1, the printing paper 9 travels approximately parallel to the direction of arrangement of the plurality of recording heads 21 to 24 under the recording heads 21 to 24. At this time, the record surface of the printing paper 9 faces upward (i.e., faces the recording heads 21 to 24). The printing paper 9 runs under tension over the plurality of transporting rollers 12. This configuration suppresses the occurrence of slack or creases in the printing paper 9 during transportation.

The image recording part 20 is a processing part that ejects ink droplets to the printing paper 9 that is being transported by the transporting mechanism 10. The image recording part 20 according to the present embodiment includes the first recording head 21, the second recording head 22, the third recording head 23, and the fourth recording head 24. The first recording head 21, the second recording head 22, the third recording head 23, and the fourth recording head 24 are arranged along the transport path of the printing paper 9.

Figure 2:
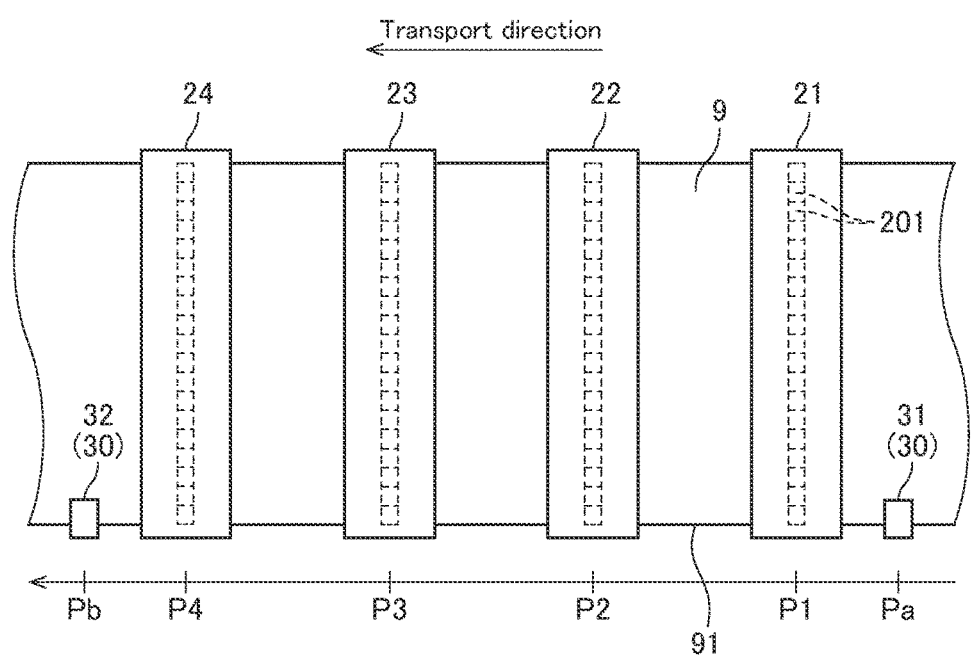
FIG. 2 is a partial top view of the image recording apparatus in the proximity of an image recording part according to the first embodiment.

FIG. 2 is a partial top view of the image recording apparatus 1 in the proximity of the image recording part 20. The four recording heads 21 to 24 each cover the entire width of the printing paper 9. As indicated by the broken lines in FIG. 2, each of the recording heads 21 to 24 has a lower surface with a plurality of nozzles 201 aligned parallel to the width direction of the printing paper 9. The recording heads 21 to 24 respectively eject black (K), cyan (C), magenta (M), and yellow (Y) ink droplets, which are color components of a multicolor image, from their plurality of nozzles 201 toward the upper surface of the printing paper 9.

That is, the first recording head 21 ejects black ink droplets to the upper surface of the printing paper 9 at a first processing position P1 in the transport path. The second recording head 22 ejects cyan ink droplets to the upper surface of the printing paper 9 at a second processing position P2 that is located downstream of the first processing position P1. The third recording head 23 ejects magenta ink droplets to the upper surface of the printing paper 9 at a third processing position P3 that is located downstream of the second processing position P2. The fourth recording head 24 ejects yellow ink droplets to the upper surface of the printing paper 9 at a fourth processing position P4 that is located downstream of the third processing position P3. In the present embodiment, the first processing position P1, the second processing position P2, the third processing position P3, and the fourth processing position P4 are equally spaced in the transport direction of the printing paper 9.

The four recording heads 21 to 24 each record a single-color image on the upper surface of the printing paper 9 by ejecting ink droplets. Then, the four single-color images are superimposed on one another so that a multicolor image is formed on the upper surface of the printing paper 9. If the positions in the transport direction of ink droplets on the printing paper 9, ejected from the four recording heads 21 to 24, are displaced from one another, the image quality of printed material deteriorates. Thus, keeping the misregistration of single-color images on the printing paper 9 within tolerance is an important factor to improve the print quality of the image recording apparatus 1.

Alternatively, a dry processing part may be additionally provided on the downstream of the recording heads 21 to 24 in the transport direction in order to dry the ink ejected to the record surface of the printing paper 9. The dry processing part may dry the ink by, for example, blowing heated gas toward the printing paper 9 and vaporizing a solvent in the ink adhering to the printing paper 9. However, the dry processing part may use other methods such as photoirradiation to dry the ink.

The two edge sensors 30 serve as detection parts that detect the position in the width direction of an edge (edge in the width direction) 91 of the printing paper 9. In the present embodiment, the edge sensors 30 are disposed at a first detection position Pa and a second detection position Pb, the first detection position Pa being located upstream of the first processing position P1 in the transport path, and the second detection position Pb being located downstream of the fourth processing position P4.

Figure 3:
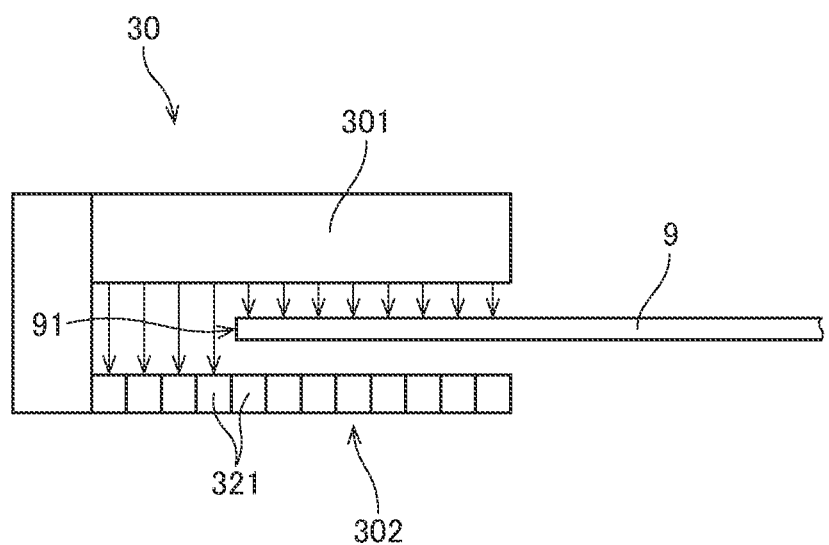
FIG. 3 schematically illustrates a structure of an edge sensor according to the first embodiment.

FIG. 3 schematically illustrates a structure of one edge sensor 30. As illustrated in FIG. 3, the edge sensor 30 includes a projector 301 that is located above the edge 91 of the printing paper 9, and a line sensor 302 that is located below the edge 91. The projector 301 emits parallel light downward. The line sensor 302 includes a plurality of light receiving elements 321 arranged in the width direction. Outside the edge 91 of the printing paper 9, the light emitted from the projector 301 enters and is detected by light receiving elements 321 as illustrated in FIG. 3. Inside the edge 91 of the printing paper 9, on the other hand, the light emitted from the projector 301 is blocked by the printing paper 9 and is not detected by light receiving elements 321. On the basis of the presence or absence of this light detection result by the plurality of light receiving elements 321, the edge sensor 30 detects the position of the edge 91 of the printing paper 9 in the width direction.

Hereinafter, the edge sensor 30 disposed at the first detection position Pa is referred to as a "first edge sensor 31" and the edge sensor 30 disposed at the second detection position Pb is referred to as a "second edge sensor 32" as illustrated in FIGS. 1 and 2. The first edge sensor 31 is one example of a "first detection part" according to the present invention. The first edge sensor 31 intermittently detects the position of the edge 91 of the printing paper 9 in the width direction at the first detection position Pa. Thus, the first edge sensor 31 acquires a detection result that indicates a change over time in the position of the edge 91 in the width direction at the first detection position Pa. The first edge sensor 31 then outputs a detection signal that indicates the obtained detection result, to the controller 40. The second edge sensor 32 is one example of a "second detection part" according to the present invention. The second edge sensor 32 intermittently detects the position of the edge 91 of the printing paper 9 in the width direction at the second detection position Pb. Thus, the second edge sensor 32 acquires a detection result that indicates a change over time in the position of the edge 91 in the width direction at the second detection position Pb. The second edge sensor 32 then outputs a detection signal that indicates the obtained detection result, to the controller 40.

The controller 40 controls operations of each part in the image recording apparatus 1. As schematically illustrated in FIG. 1, the controller 40 is configured by a computer that includes a processor 401 such as a CPU, a memory 402 such as a RAM, and a storage 403 such as a hard disk drive. The storage 403 stores a computer program CP for executing print processing. As indicated by broken lines in FIG. 1, the controller 40 is electrically connected to each of the transporting mechanism 10, the four recording heads 21 to 24, and the two edge sensors 30, which are described above. The controller 40 controls operations of these parts in accordance with the computer program CP. Thus, the print processing progresses in the image recording apparatus 1.

<1-2. Detection and Correction Processing>

When executing the print processing, the controller 40 acquires the detection signals from the first edge sensor 31 and the second edge sensor 32. On the basis of the acquired detection signals, the controller 40 detects the amount of displacement in the position of the printing paper 9 in the transport direction. The controller 40 also corrects the timing of ejection of ink droplets from the four recording heads 21 to 24 on the basis of the detected amount of displacement in position. This suppresses the misregistration of single-color images on the printing paper 9.

Figure 4:
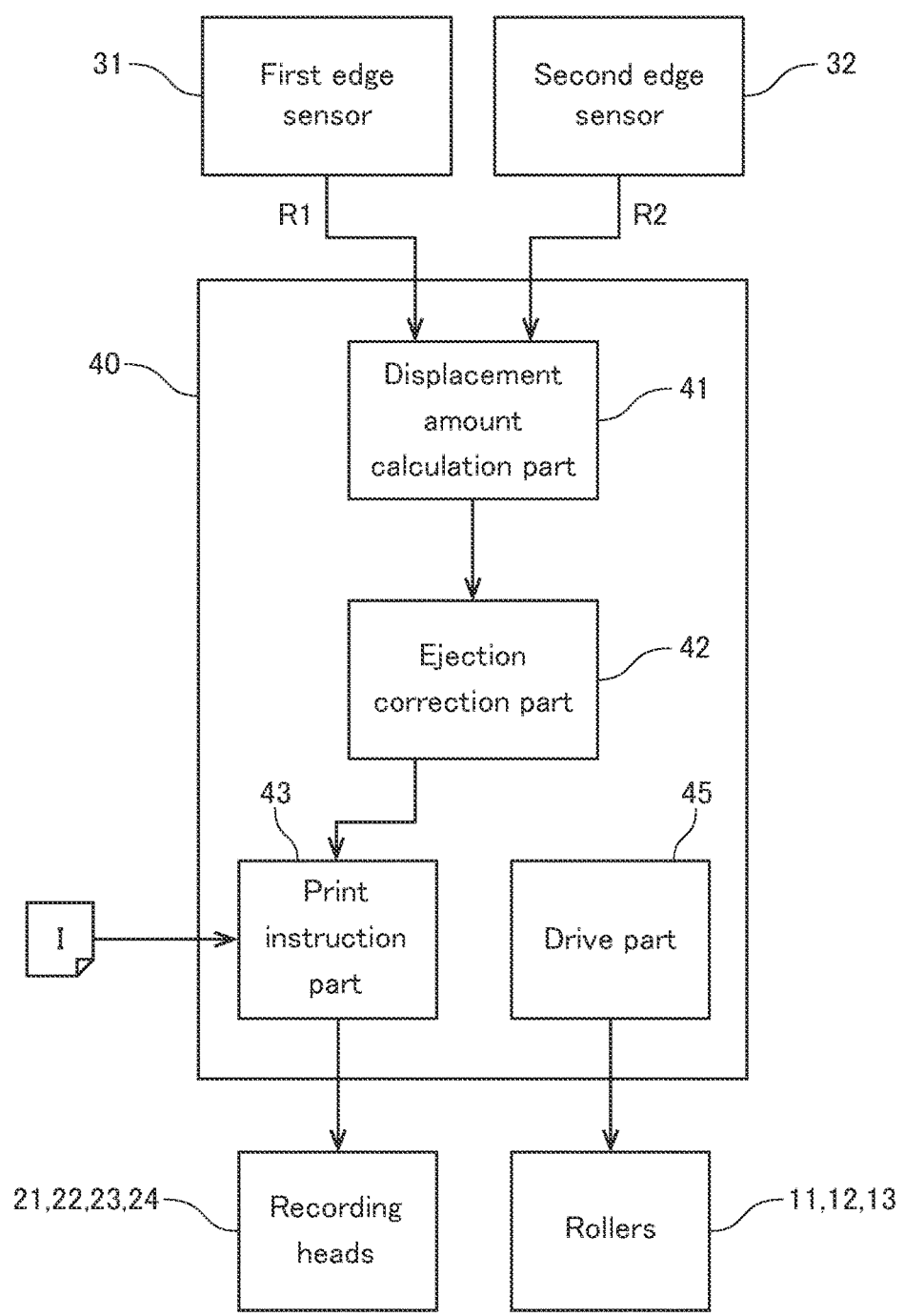
FIG. 4 is a block diagram schematically illustrating functions of a controller according to the first embodiment.

FIG. 4 is a block diagram schematically illustrating the functions of implementing this detection and correction processing in the controller 40. As illustrated in FIG. 4, the controller 40 includes a displacement amount calculation part 41, an ejection correction part 42, a print instruction part 43, and a drive part 45. The functions of the displacement amount calculation part 41, the ejection correction part 42, the print instruction part 43, and the drive part 45 are implemented by the processor 401 operating in accordance with the computer program CP. Note that the drive part 45 transports the printing paper 9 along the transport path by rotationally driving at least one of the plurality of rollers including the feed roller 11, the plurality of transporting rollers 12, and the take-up roller 13 at a constant rotation speed.

Figure 5:
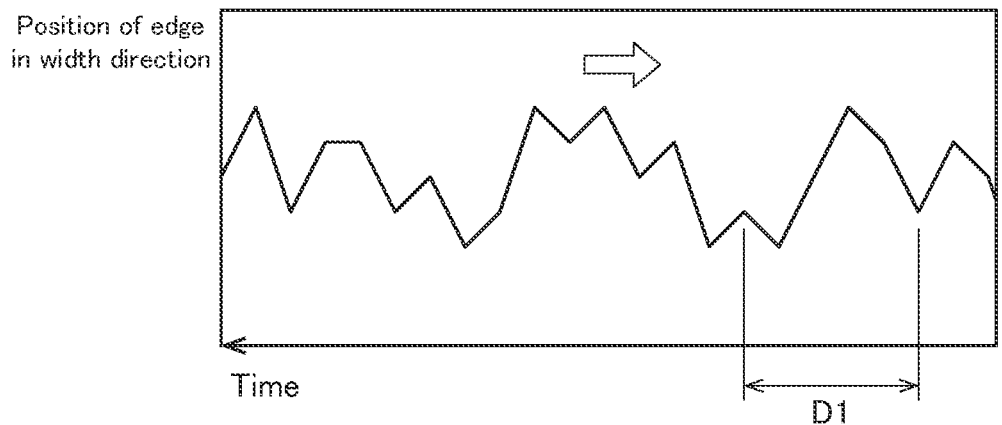
FIG. 5 is a graph showing an example of first and second detection results according to the first embodiment.
Figure 5:
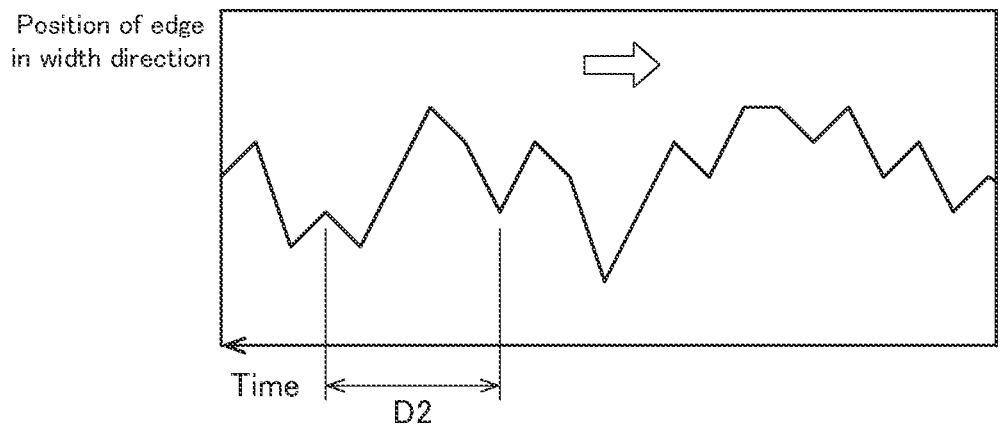

The displacement amount calculation part 41 detects the amount of displacement in the position of the printing paper 9 in the transport direction on the basis of the first detection result R1 obtained from the first edge sensor 31 and the second detection result R2 obtained from the second edge sensor 32. FIG. 5 is a graph showing an example of the first detection result R1 and the second detection result R2. The horizontal axis in the graph in FIG. 5 represents time, and the vertical axis represents the position of the edge 91 in the width direction. In the graph in FIG. 5, the left end of the horizontal axis represents current time, with the passage of time moving in the direction from left to right. Thus, data lines in FIG. 5 move to the right with the passage of time as indicated by hollow arrows.

There are fine irregularities on the edge 91 of the printing paper 9. The first edge sensor 31 and the second edge sensor 32 detect the position of the edge 91 of the printing paper 9 in the width direction at pre-set very short time intervals (e.g., every 50 microseconds). Thus, data as illustrated in FIG. 5 is obtained, which indicates a change over time in the position of the edge 91 of the printing paper 9 in the width direction. The first detection result R1 corresponds to data that reflects the shape of the edge 91 of the printing paper 9 that is passing through the first detection position Pa. The second detection result R2 corresponds to data that reflects the shape of the edge 91 of the printing paper 9 that is passing through the second detection position Pb.

The displacement amount calculation part 41 compares the first detection result R1 and the second detection result R2 so as to identify a point where the same edge 91 of the printing paper 9 has been detected from the first detection result R1 and the second detection result R2. More specifically, for each data section (a given range of time) included in the first detection result R1, the displacement amount calculation part 41 identifies a highly matched data section that is included in the second detection result R2. Hereinafter, a data section included in the first detection result R1 is referred to as a "comparison source data section D1," and a data section included in the second detection result R2 is referred to as a "to-be-compared data section D2."

The identification of the data section may use a matching technique such as cross-correlation or residual sum of squares. For each comparison source data section D1 included in the first detection result R1, the displacement amount calculation part 41 selects a plurality of to-be-compared data sections D2 included in the second detection result R2 as candidates for the corresponding data section. Also, for each selected to-be-compared data section D2, the displacement amount calculation part 41 calculates an evaluation value that indicates the degree of matching with the comparison source data section D1. Then, the displacement amount calculation part 41 determines a to-be-compared data section D2 that has a highest evaluation value as a to-be-compared data section D2 corresponding to the comparison source data section D1.

Note that a time difference between the first detection result R1 and the second detection result R2 does not considerably differ from the ideal amount of time required to transport the printing paper 9 from the first detection position Pa to the second detection position Pb. Thus, the aforementioned search for the to-be-compared data sections D2 may be conducted only at around the time after the elapse of the ideal amount of time for transporting from the comparison source data section D1. Once the to-be-compared data section D2 corresponding to the comparison source data section D1 has been identified, the next and subsequent searches may be conducted only on the proximity of a data section adjacent to the searched to-be-compared data section D2.

In this way, the displacement amount calculation part 41 may estimate a to-be-compared data section D2 of the second detection result R2 that corresponds to the comparison source data section D1 of the first detection result R1 and search only the proximity of the estimated data section for a to-be-compared data section D2 with a high degree of matching with the comparison source data section D1. In this case, the range of search for the to-be-compared data section D2 is narrowed. Thus, it is possible to reduce arithmetic processing loads on the displacement amount calculation part 41.

Thereafter, the displacement amount calculation part 41 calculates the actual amount of time required to transport the printing paper 9 from the first detection position Pa to the second detection position Pb on the basis of the time difference between the detection time of the comparison source data section D1 and the detection time of the corresponding to-be-compared data section D2. The displacement amount calculation part 41 also calculates the actual transporting speed of the printing paper 9 under the image recording part 20 on the basis of the calculated amount of time for transporting. Then, the displacement amount calculation part 41 calculates, on the basis of the calculated transporting speed, the times when each portion of the printing paper 9 reaches the first processing position P1, the second processing position P2, the third processing position P3, and the fourth processing position P4. As a result, the amount of displacement in the position of each portion of the printing paper 9 in the transport direction is calculated for the case where the printing paper 9 is transported at the ideal transporting speed. The amount of displacement in the position is calculated in such a way that a difference between the time when the printing paper 9 that is transported at the ideal transporting speed is assumed to reach each of a plurality of positions (including the first processing position P1, the second processing position P2, the third processing position P3, and the fourth processing position P4) and the actual time when the printing paper 9 reaches that position is multiplied by the actual transporting speed.

In this way, the image recording apparatus 1 according to the present embodiment detects the shape of the edge 91 of the printing paper 9 at the two positions including the first detection position Pa and the second detection position Pb, and calculates the amount of displacement in the position of the printing paper 9 in the transport direction on the basis of the detection results. Thus, the amount of displacement in the position of the printing paper 9 in the transport direction can be detected without depending on images such as register marks formed on the surface of the printing paper 9.

In particular, according to the present embodiment, the ejection of ink droplets to the record surface of the printing paper 9 is conducted between the first detection position Pa and the second detection position Pb. Thus, even if the length in the transport direction of the printing paper 9 locally extends due to the adhesion of ink, the amount of displacement in position in the transport direction caused by this elongation can be obtained from the detection results obtained at the first detection position Pa and the second detection position Pb.

Referring back to FIG. 4, the ejection correction part 42 corrects the timing of ejection of ink droplets from each of the recording heads 21 to 24 on the basis of the amount of displacement in position calculated by the displacement amount calculation part 41. For example, if the times when a portion of the printing paper 9 where an image is to be recorded arrives at each of the processing positions P1 to P4 are behind the ideal times, the ejection correction part 42 delays the timing of ejection of ink droplets from each of the recording heads 21 to 24. If the times when a portion of the printing paper 9 where an image is to be recorded arrives at each of the processing positions P1 to P4 are earlier than the ideal times, the ejection correction part 42 advances the timing of ejection of ink droplets from each of the recording heads 21 to 24.

The print instruction part 43 controls the operation of ejecting ink droplets from each of the recording heads 21 to 24 on the basis of received image data I. At this time, the print instruction part 43 references a correction value for the timing of ejection that is output from the ejection correction part 42. Then, the print instruction part 43 shifts the original timing of ejection based on the image data I on the basis of the correction value. Thus, at each of the processing positions P1 to P4, ink droplets of each color are ejected at appropriate locations on the printing paper 9 with respect to the transport direction. This suppresses the misregistration of single-color images formed by each color ink. As a result, it is possible to obtain a high-quality print image with a small misregistration of single-color images on the printing paper 9.

2. Second Embodiment

Next, an image recording apparatus according to a second embodiment of the present invention will be described. The following description focuses on differences from the first embodiment, and redundant descriptions of parts that are identical to those described in the first embodiment will be omitted.

Figure 6:
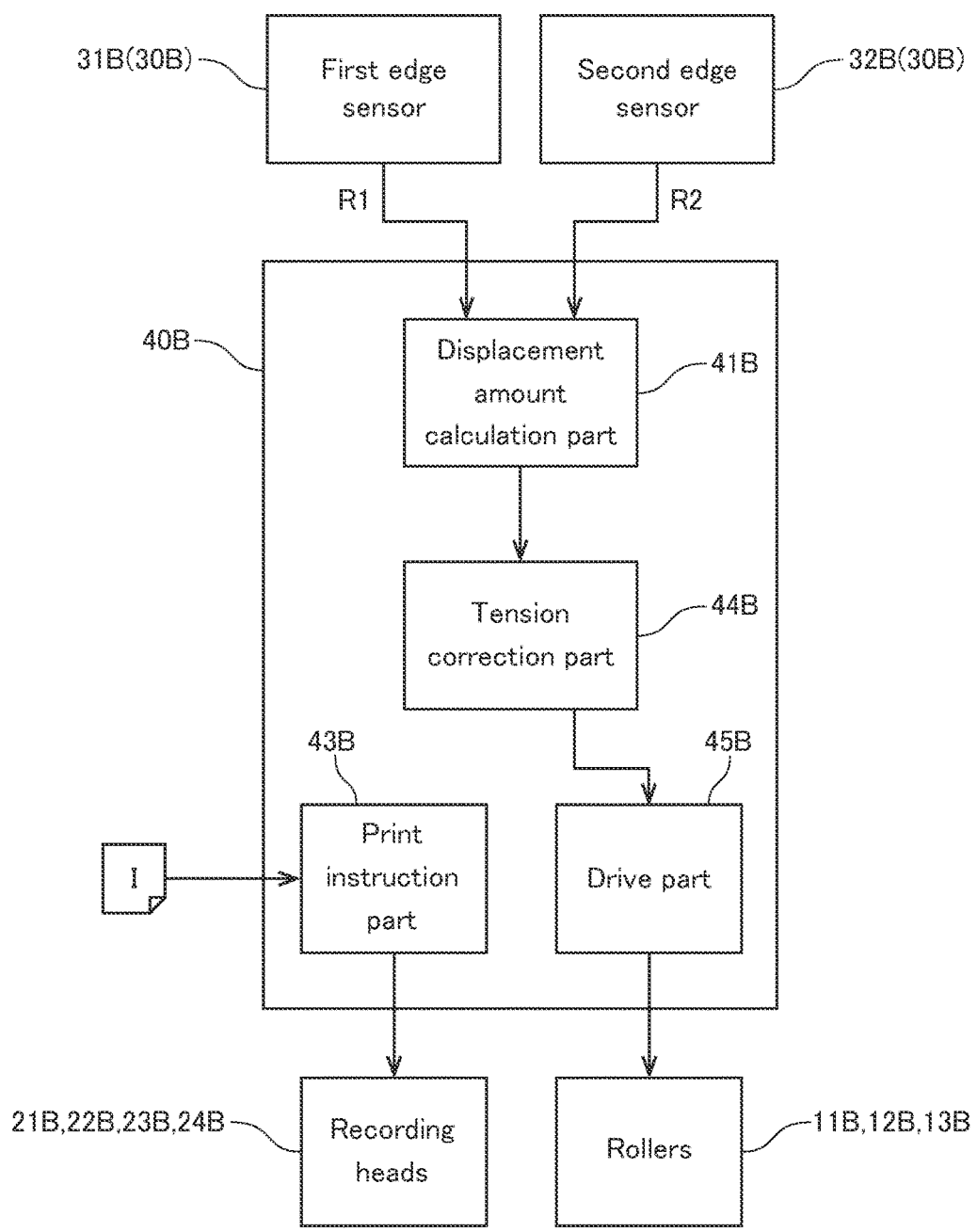
FIG. 6 is a block diagram schematically illustrating functions of a controller according to a second embodiment.

FIG. 6 is a block diagram schematically illustrating the functions of a controller 40B according to the second embodiment. As illustrated in FIG. 6, the controller 40B includes a displacement amount calculation part 41B, a print instruction part 43B, a tension correction part 44B, and a drive part 45B. The controller 40B is electrically connected to each of a plurality of rollers of a transporting mechanism that include a feed roller 11B, a plurality of transporting rollers 12B, and a take-up roller 13B; four recording heads 21B to 24B; and two edge sensors 30B.

As in the first embodiment, the displacement amount calculation part 41B detects the amount of displacement in the position of the printing paper in the transport direction on the basis of a first detection result R1 obtained from a first edge sensor 31B and a second detection result R2 obtained from a second edge sensor 32B. Thus, the amount of displacement in the position of the printing paper in the transport direction can be detected without depending on images such as register marks formed on a surface of the printing paper. The ejection of ink droplets to the record surface of the printing paper is conducted between a first detection position where the first edge sensor 31B is disposed and a second detection position where the second edge sensor 32B is disposed, as in the first embodiment. Thus, even if the length in the transport direction of the printing paper locally extends due to the adhesion of ink, the amount of displacement in position in the transport direction caused by this elongation can be obtained from the detection results obtained at the first detection position and the second detection position.

The tension correction part 44B corrects the driving of the take-up roller 13B among the plurality of rollers on the basis of the amount of displacement in the position of the printing paper in the transport direction. This results in correcting the tension applied in the transport direction to the printing paper and adjusting the amount of elongation of the printing paper due to a change in tension. More specifically, the tension correction part 44B first calculates the amount of elongation of the printing paper in the transport direction on the basis of the amount of displacement in the position of the printing paper in the transport direction. The amount of elongation is calculated from, for example, a difference between the amount of displacement in position at a first processing position where ink droplets are ejected from the aforementioned first recording head 21B and the amount of displacement in position at a fourth processing position where ink droplets are ejected from the fourth recording head 24B. The section used to calculate the amount of elongation is, however, not limited to this example. The tension applied to the printing paper and the amount of elongation of the printing paper are proportional to each other.

The drive part 45B references the amount of elongation of the printing paper (correction value) output from the tension correction part 44B. When the amount of elongation is greater than a first reference value that is a maximum tolerance value, the drive part 45B, for example, reduces the number of revolutions in the direction of taking up the printing paper by the take-up roller 13B. This reduces the tension applied to the printing paper and reduces the amount of elongation. When the amount of elongation is less than a second reference value that is a minimum tolerance value, the drive part 45B, for example, increases the number of revolutions in the direction of taking up the printing paper by the take-up roller 13B. This increases the tension applied to the printing paper and increases the amount of elongation. The drive part 45B may correct the driving of at least one of the plurality of rollers in order to correct the tension applied in the transport direction to the printing paper. For example, when the amount of elongation is greater than the first reference value that is a maximum tolerance value, the drive part 45B may increase the number of revolutions in the direction of feeding the printing paper by the feed roller 11B.

Instead of calculating the amount of elongation of the printing paper (correction value), the tension correction part 44B may calculate the actual tension applied to the printing paper as a correction value. Then, the drive part 45B may correct the driving of a roller so as to bring the actual tension close to the tension to be applied to the printing paper when the printing paper is transported at the ideal transporting speed. The tension applied to the printing paper can be calculated by, for example, multiplying the amount of elongation of the printing paper by the Young's modulus of the printing paper. Instead of correcting the driving of the rollers, the tension correction part 44b may use a dancing roller to correct the tension applied to the printing paper.

As another alternative, instead of correcting the amount of elongation of the printing paper or the tension applied to the printing paper, the drive part 45B may correct the driving of a roller, for example, such that the actual times when the printing paper reaches the first and fourth processing positions come close to the times when the printing paper transported at the ideal transporting speed is assumed to reach the first and fourth processing positions.

The print instruction part 43B controls the operation of ejecting ink droplets from each of the recording heads 21B to 24B on the basis of the received image data I, as in the first embodiment. In the present embodiment, however, the ejection of ink droplets from the recording heads 21B to 24B is not corrected on the basis of the amount of displacement in the position of the printing paper calculated by the displacement amount calculation part 41B. By correcting the amount of elongation of the printing paper or the tension applied to the printing paper as described above, at each of the processing positions of the recording heads 21B to 24B, ink droplets of each ink are ejected at appropriate locations on the printing paper with respect to the transport direction. This suppresses the misregistration of single-color images formed by each color ink. As a result, it is possible to obtain a high-quality print image with a small misregistration of single-color images. Alternatively, the ejection of ink droplets from the recording heads 21B to 24B may also be corrected, in addition to correcting the amount of elongation of the printing paper and the tension applied to the printing paper on the basis of the amount of displacement in the position of the printing paper as in the present embodiment.

3. Variations

While exemplary embodiments of the present invention have been described, the present invention is not intended to be limited to the embodiments described above.

In the above-described first embodiment, the ejection correction part 42 corrects the timing of ejection of ink droplets from the recording heads 21 to 24 without correcting the received image data I itself. Alternatively, the ejection correction part 42 may correct the image data I on the basis of the amount of displacement in position calculated by the displacement amount calculation part 41. In that case, the print instruction part 43 may instruct each of the recording heads 21 to 24 to eject ink droplets in accordance with the corrected image data I. As another alternative, the ejection correction part 42 may correct the position of ejection of ink from each of the recording heads 21 to 24 on the basis of the amount of displacement in position calculated by the displacement amount calculation part 41. That is, the ejection correction part 42 may correct either the timing or position of ejection of ink droplets from the image recording part 20.

Figure 7:
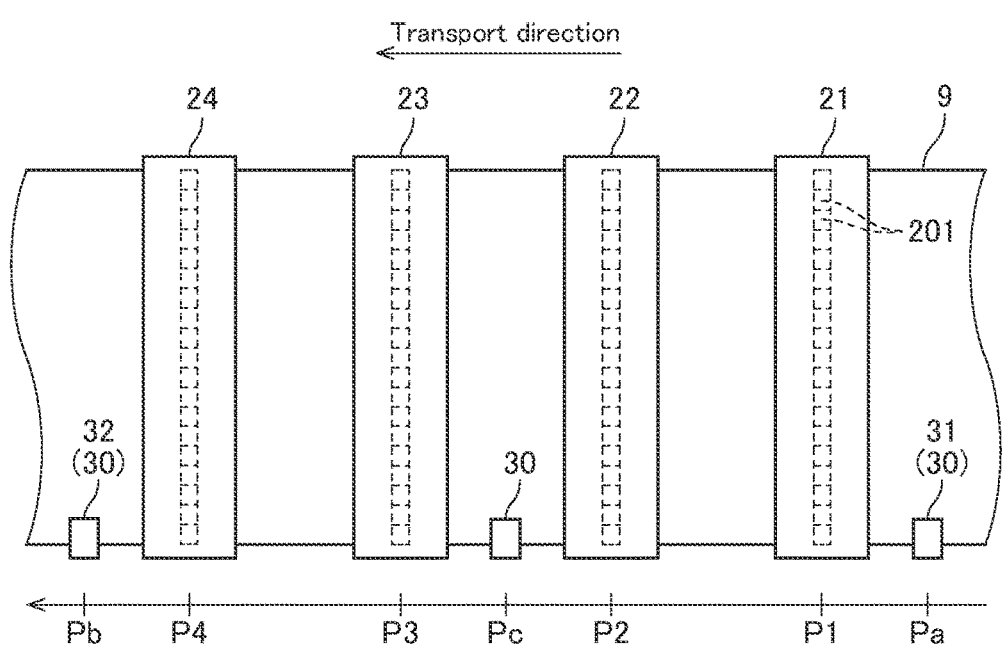
FIG. 7 is a partial top view of the image recording apparatus in the proximity of the image recording part according to a variation.

In the above-described first embodiment, the edge sensors 30 are disposed at only two positions including the first detection position Pa and the second detection position Pb. However, the number of edge sensors 30 disposed in the transport path of the printing paper 9 may be three or more. For example, as illustrated in FIG. 7, the edge sensors 30 may be disposed at three positions in the transport path, including the first detection position Pa located upstream of the first processing position P1, an intermediate detection position Pc located between the second processing position P2 and the third processing position P3, and the second detection position Pb located downstream of the fourth processing position P4.

In this case, the amount of displacement in the position of the printing paper 9 in the transport direction can be calculated more accurately on the basis of the detection results obtained by the three edge sensors 30. For example, even if the amount of displacement in the position of the printing paper 9 in the transport direction between the first and second processing positions P1 and P2 differs from the amount of displacement in the position of the printing paper 9 in the transport direction between the third and fourth processing positions P3 and P4 due to a difference in the amount of ink deposited, it is possible to properly detect the amount of displacement in position at each processing position.

Figure 8:
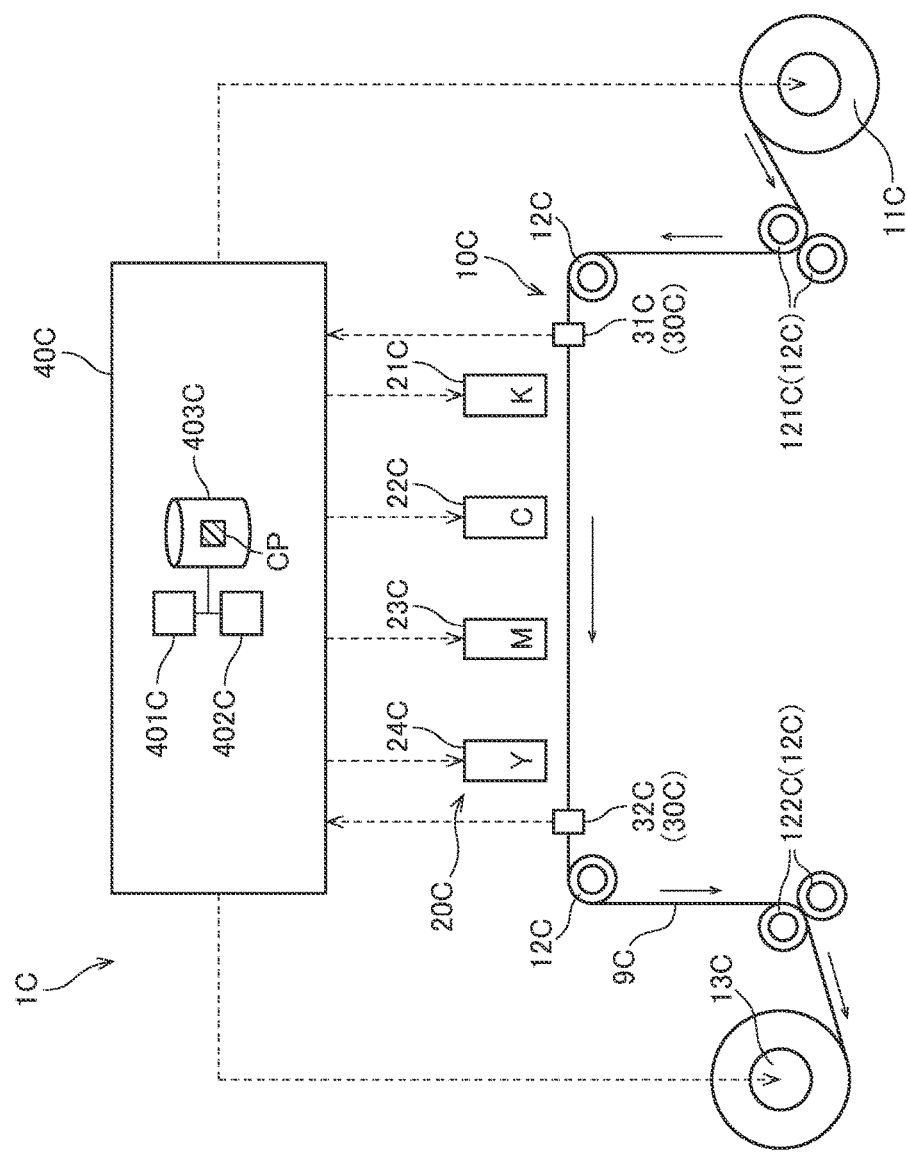
FIG. 8 illustrates a configuration of an image recording apparatus according to another variation.

FIG. 8 illustrates a configuration of an image recording apparatus 1C according to another variation. The following description focuses on differences from the above-described embodiments, and redundant descriptions of parts that are identical to those described in the above embodiments will be omitted, including descriptions of some reference numerals. In the example illustrated in FIG. 8, a transporting mechanism 10C includes a plurality of rollers that include a feed roller 11C, a plurality of transporting rollers 12C, and a take-up roller 13C. The transporting rollers 12C include two pairs of nip rollers 121C and 122C that rotate to feed printing paper 9C in the transport direction while sandwiching and holding the printing paper 9C. The nip rollers 121C are located upstream of an image recording part 20C in the transport direction. The nip rollers 122C are located downstream of the image recording part 20C in the transport direction. In the case of correcting the amount of elongation of the printing paper or the tension applied to the printing paper, the driving of the nip rollers 121C may be corrected. For example, when the amount of elongation of the printing paper is greater than the first reference value that is a maximum tolerance value, the number of revolutions in the direction of feeding the printing paper by the nip rollers 121C may be increased.

The edge sensors may be provided at positions under the recording heads. For example, the edge sensors may be provided at positions under each of the four recording heads.

In the above-described embodiments, the edge sensors are provided on only one side of the printing paper in the width direction. Alternately, edge sensors may be provided on opposite sides of the printing paper in the width direction. In this case, the amount of displacement in the position of the printing paper in the transport direction can be detected on the basis of the detection results obtained at the edges on the opposite sides of the printing paper in the width direction. This further increases accuracy in the detection of the amount of displacement in position.

The image recording apparatuses according to the above-described embodiments calculate the transporting speed of the printing paper on the basis of the signals obtained from the edge sensors, and calculate the amount of displacement in the position of the printing paper in the transport direction on the basis of the calculated transporting speed. Alternatively, the image recording apparatuses may use the amount of difference in the transporting speed of the printing paper as a basis to correct the timing of ejection of ink droplets from the recording heads or to correct the driving of a roller. That is, the displacement amount calculation part may calculate either the amount of displacement in the position of the printing paper in the transport direction or the amount of difference in the transporting speed of the printing paper.

The image recording apparatuses may have a function of detecting and correcting the amount of displacement in the position of the printing paper in the width direction on the basis of the signals obtained from the edge sensors. The image recording apparatuses may also have a function of detecting and correcting conditions of the printing paper, such as meandering, a change in obliqueness, travelling position, and a change in dimension in the width direction, on the basis of the amount of displacement in the position of the printing paper in the width direction. This eliminates the need to separately provide edge sensors for detecting the amount of displacement in the position of the printing paper in the transport direction and edge sensors for detecting the amount of displacement in the position of the printing paper in the width direction. Thus, the number of parts of the image recording apparatuses can be reduced.

In FIG. 2 described above, the nozzles 201 of each of the recording heads 21 to 24 are aligned in a single line in the width direction. Alternatively, the nozzles 201 of each of the recording heads 21 to 24 may be aligned in two or more lines.

In the above-described embodiments, translucent edge sensors are used as the first and second detection parts. Alternatively, other methods may be employed as a method of detection used in the first and second detection parts. For example, reflection optical sensors or CCD cameras may be used. The first and second detection parts may detect the position of the edge of the printing paper two-dimensionally, i.e., in the transport and width directions. The operations of detection by the first and second detection parts may be conducted intermittently as in the above-described embodiments, or may be conducted continuously.

In the above-described embodiments, for example, a clock or a counter that is separate from the image recording apparatuses may be used to measure the amount of time to transport the printing paper or the time when the printing paper reaches each location. Alternatively, instead of using such a clock or a counter, time may be measured on the basis of signals received from a rotary encoder connected to the rollers, which are rotationally driven at a constant rotation speed in the transporting mechanism.

In the above-described embodiments, the image recording apparatuses include four recording heads. Alternatively, the number of recording heads in the image recording apparatus may be in the range of one to three or may be five or more. For example, a recording head that ejects ink of a special color may be provided, in addition to the recording heads that eject ink of K, C, M, and Y colors.

The present invention does not exclude the case of detecting the amount of displacement in the position of the printing paper on the basis of reference images such as register marks formed on the surface of the printing paper. For example, the detection results obtained using reference images such as register marks may be used in combination with the edge detection results obtained by the edge sensors as described above so as to detect the amount of displacement in the position of the printing paper in the transport direction or the amount of difference in the transporting speed of the printing paper.

The image recording apparatuses described above record a multicolor image on the printing paper by inkjet printing. Alternatively, the base material processing apparatus according to the present invention may also be an apparatus that uses different methods other than inkjet printing (e.g., electrophotography or exposure) to record a multicolor image on the printing paper. The image recording apparatuses described above perform print processing on printing paper that is a base material. Alternatively, the base material processing apparatus according to the present invention may perform predetermined processing on a long band-like base member (e.g., resin film or gold foil) other than ordinary paper.

Each element used in the above-described embodiments and variations may be appropriately combined within a range that presents no contradictions.

While the invention has been shown and described in detail, the foregoing description is in all aspects illustrative and not restrictive. It is therefore to be understood that numerous modifications and variations can be devised without departing from the scope of the invention.

What is claimed is:

1. A base material processing apparatus comprising:
    a transporting mechanism that transports a long band-like base material in a longitudinal direction of the base material along a predetermined transport path;
    a first detection part that acquires a first detection result by continuously or intermittently detecting a position of an edge of the base material in a width direction at a first detection position in said transport path;

a second detection part that acquires a second detection result by continuously or intermittently detecting the position of the edge of the base material in the width direction at a second detection position that is located downstream of said first detection position in said transport path; and a displacement amount calculation part that calculates an amount of displacement in position of the base material in a transport direction or an amount of difference in transporting speed of the base material on the basis of said first detection result and said second detection result, wherein said displacement amount calculation part identifies a highly matched data section included in said second detection result for each data section included in said first detection result, and calculates the amount of displacement in position of the base material in the transport direction or the amount of difference in transporting speed of the base material on the basis of said data section that has been identified.

2. The base material processing apparatus according to claim 1, wherein said displacement amount calculation part identifies a data section that has a highest evaluation value in said second detection result for each data section included in said first detection result, the evaluation value indicating a degree of matching.

3. The base material processing apparatus according to claim 1, wherein said displacement amount calculation part estimates a data section of said second detection result that corresponds to a data section included in said first detection result, and in proximity to said data section that has been estimated, identifies a data section of said second detection result that has a high degree of matching with said data section included in said first detection result.

4. The base material processing apparatus according to claim 1, wherein said transporting mechanism includes a plurality of rollers, said base material processing apparatus further comprising:

a drive part that rotationally drives at least one of said plurality of rollers; and a tension correction part that corrects tension applied in the transport direction to the base material by correcting driving of at least one of said plurality of rollers on the basis of said amount of displacement or said amount of difference calculated by said displacement amount calculation part.

5. The base material processing apparatus according to claim 4, wherein said tension correction part calculates an amount of elongation of the base material in the transport direction on the basis of said amount of displacement or said amount of difference, and reduces said tension if said amount of elongation is greater than a first reference value or increases said tension if said amount of elongation is less than a second reference value.

6. The base material processing apparatus according to claim 1, further comprising:

a processing part that processes the base material at a processing position in said transport path, wherein said displacement amount calculation part calculates the amount of displacement in position of the base material in the transport direction or the amount of difference in transporting speed of the base material at said processing position.

7. The base material processing apparatus according to claim 6, wherein said processing part is an image recording part that ejects ink to a surface of the base material to record an image on the base material.

8. The base material processing apparatus according to claim 7, wherein said processing part ejects ink to the surface of the base material at a position between said first detection position and said second detection position.

9. The base material processing apparatus according to claim 7, further comprising:

an ejection correction part that corrects a timing or position of ejection of ink from said image recording part on the basis of said amount of displacement or said amount of difference calculated by said displacement amount calculation part.

10. The base material processing apparatus according to claim 9, wherein said image recording part includes a plurality of recording heads arranged in said transport direction, and said plurality of recording heads each eject ink of a different color.

11. A detection method for detecting an amount of displacement in position of a long band-like base material in a transport direction or an amount of difference in transporting speed of the base material while transporting the base material in a longitudinal direction of the base material along a predetermined transport path, the method comprising operations of:

a) acquiring a first detection result by continuously or intermittently detecting a position of an edge of a base material in a width direction at a first detection position in said transport path;

b) acquiring a second detection result by continuously or intermittently detecting the position of the edge of the base material in the width direction at a second detection position that is located downstream of said first detection position in said transport path; and c) calculating an amount of displacement in position of the base material in the transport direction or an amount of difference in transporting speed of the base material on the basis of said first detection result and said second detection result, wherein in said operation c), a highly matched data section included in said second detection result is identified for each data section included in said first detection result, and the amount of displacement in position of the base material in the transport direction or the amount of difference in transporting speed of the base material is calculated on the basis of said data section that has been identified.

12. The detection method according to claim 11, wherein in said operation c), a data section of said second detection result that has a highest evaluation value is identified for each data section included in said first detection result, the evaluation value indicating a degree of matching.

13. The detection method according to claim 11, wherein in said operation c), a data section of said second detection result that corresponds to a data section included in said first detection result is estimated, and in proximity to said data section that has been estimated, a data section of said second detection result that has a high degree of matching with said data section included in said first detection result is identified.

14. The detection method according to claim 11, further comprising:
   d) correcting tension applied in the transport direction to the base material on the basis of said amount of displacement or said amount of difference calculated in said operation c).

15. The detection method according to claim 14, wherein in said operation d), an amount of elongation of the base material in the transport direction is calculated on the basis of said amount of displacement or said amount of difference calculated in said operation c), and said tension is reduced if said amount of elongation is greater than a first reference value, or increased if said amount of elongation is less than a second reference value.

* * * * *